United States Patent
Feenstra et al.

(10) Patent No.: US 9,664,891 B2
(45) Date of Patent: May 30, 2017

(54) ELECTROWETTING ELEMENT WITH CONTROLLED FLUID MOTION

(71) Applicant: Amazon Technologies, Inc., Seattle, WA (US)

(72) Inventors: Bokke Johannes Feenstra, Nuenen (NL); Roy Van Dijk, Eindhoven (NL); Robert Hayes, Hong Kong (CN)

(73) Assignee: Amazon Technologies, Inc., Seattle, WA (US)

(*) Notice: Subject to any disclaimer, the term of this patent is extended or adjusted under 35 U.S.C. 154(b) by 1 day.

(21) Appl. No.: 14/562,321

(22) Filed: Dec. 5, 2014

(65) Prior Publication Data

US 2015/0085343 A1   Mar. 26, 2015

Related U.S. Application Data

(63) Continuation of application No. 12/303,487, filed as application No. PCT/EP2007/055420 on Jun. 1, 2007, now Pat. No. 8,908,254.

(30) Foreign Application Priority Data

Jun. 6, 2006 (GB) .................................... 0611134.8

(51) Int. Cl.
*G02B 26/00* (2006.01)

(52) U.S. Cl.
CPC .......... *G02B 26/005* (2013.01); *G02B 26/004* (2013.01)

(58) Field of Classification Search
CPC ............................ G02B 26/004; G02B 26/005
USPC ................... 359/290–297, 665–667
See application file for complete search history.

(56) References Cited

U.S. PATENT DOCUMENTS

| 3,703,332 | A | 11/1972 | Taylor |
| 6,961,167 | B2 | 11/2005 | Prins et al. |
| 7,245,439 | B2 | 7/2007 | Kuiper et al. |
| 7,388,650 | B2 | 6/2008 | Bleeker |

(Continued)

FOREIGN PATENT DOCUMENTS

| CN | 1682143 A | 10/2005 |
| TW | M263514 | 5/1993 |

(Continued)

OTHER PUBLICATIONS

Thibault Roques-Carmes, et al., "Liquid Behavior Inside Display Pixel Based on Electrowetting", Journal of Applied Physics, vol. 95, No. 8, (Apr. 15, 2004), pp. 4389-4396.

(Continued)

*Primary Examiner* — Scott J Sugarman
*Assistant Examiner* — Vipin Patel
(74) *Attorney, Agent, or Firm* — EIP US LLP

(57) ABSTRACT

An electrowetting element includes a first fluid and a second fluid and a support plate having a first surface adjoining less than all of a perimeter of a second surface. The first surface has a wettability for the first fluid lower than a wettability of the second surface for the first fluid. An electrode is associated with the support plate for use in applying a voltage for switching the first and second fluids between a first configuration with the first fluid adjoining a first area of the second surface; and a second configuration with the first fluid adjoining a second area of the second surface, the second area being smaller than the first area.

19 Claims, 4 Drawing Sheets

(56) References Cited

U.S. PATENT DOCUMENTS

| | | | |
|---|---|---|---|
| 7,420,549 B2 | 9/2008 | Jacobson et al. | |
| 7,812,809 B2 | 10/2010 | Choi et al. | |
| 7,872,790 B2 * | 1/2011 | Steckl | G02B 26/004 |
| | | | 359/253 |
| 8,031,168 B2 | 10/2011 | Feenstra et al. | |
| 9,086,565 B2 * | 7/2015 | Feenstra | G02B 26/004 |
| 2005/0253779 A1 | 11/2005 | Feenstra et al. | |
| 2006/0132927 A1 | 6/2006 | Yoon | |
| 2007/0133079 A1 | 6/2007 | Cernasov | |

FOREIGN PATENT DOCUMENTS

| | | |
|---|---|---|
| WO | 2004027489 A1 | 4/2004 |
| WO | 2004104670 A1 | 12/2004 |
| WO | 2004104671 A1 | 12/2004 |
| WO | 2005096289 A1 | 10/2005 |
| WO | 2006017129 A2 | 2/2006 |
| WO | 2006021912 A1 | 3/2006 |

OTHER PUBLICATIONS

Robert A. Hayes & B.J. Feenstra, "Video-Speed Electronic Paper Based on Electrowetting", Nature, Sep. 25, 2003, pp. 383-385.
B.J. Feenstra, et al., "Video-Speed Response in a Reflective Electrowetting Display", IDW Proceedings 03, 1747 (2003), pp. 1-3.

* cited by examiner

US 9,664,891 B2

ELECTROWETTING ELEMENT WITH CONTROLLED FLUID MOTION

CROSS REFERENCE TO RELATED APPLICATIONS

This application claims the benefit of the following applications under U.S.C. §120: (1) U.S. Ser. No. 12/303,487 filed Dec. 4, 2008, and (2) PCT/EP2007/055420 filed Jun. 1, 2007, and under 35 U.S.C. §119 of GB 0611134.8 filed Jun. 6, 2006. The contents and teachings of these applications are hereby incorporated by reference in their entirety.

BACKGROUND

Display devices containing fluids which can be switched between different fluid configurations to provide different optical characteristics are known.

In a known display device, a movement of the fluids during switching is controlled by using an insulating layer having a particular shape to modify an electric field applied to the fluids. A particular electrode structure or an inhomogeneous oil fluid layer may be used alternatively to control the fluid motion.

Another known device has picture elements which have a shape that determines, upon switching, a preferred direction of movement of fluids within the picture elements.

A known optical switch contains fluids which are switchable by application of a voltage across the fluids. An electrode used to apply the voltage has a shape which determines a preferred direction of movement of the fluids upon switching.

DETAILED DESCRIPTION

Figure 1:
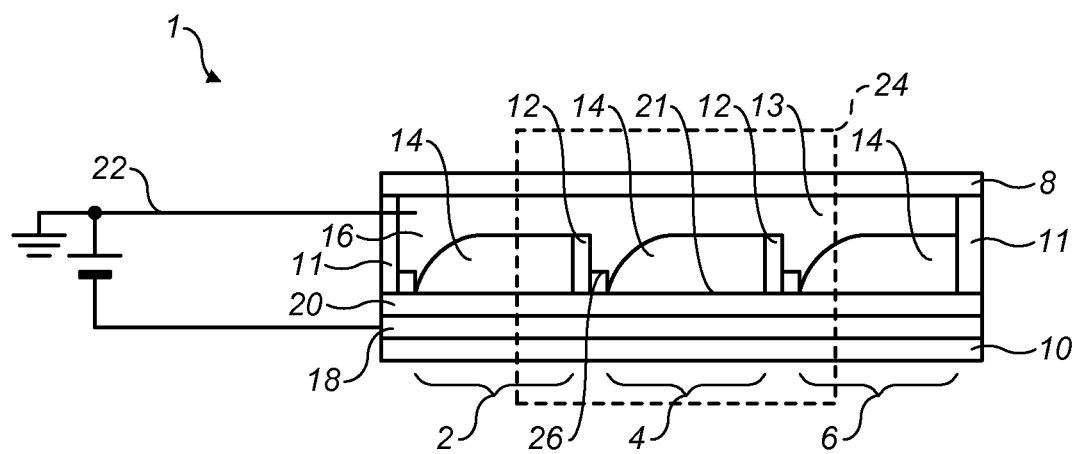
FIG. 1 shows schematically a cross section of apparatus in accordance with an embodiment.

In accordance with embodiments, there is provided optical apparatus for a display device, wherein said optical apparatus comprises:

a) a cavity;
b) a first fluid and a second fluid, held within said cavity, which are immiscible with each other, said first and second fluids being separated from each other by a meniscus having a peripheral edge;
c) a fluid motion control system arranged to control movement of said first and second fluids within said cavity using electrostatic forces; and
d) a first surface and a second surface, said first surface having a different wettability for said first fluid than said second surface, wherein said first and second surfaces are arranged in said cavity to determine, upon activation of the fluid motion control system, a motion of said fluids within said cavity which has a preferential initiation at a first part of said peripheral edge.

With appropriate arrangement of the first and second surfaces, the first and second fluids adopt certain fluid configurations prior to activation of the fluid motion control system. When the fluid motion control system is activated, electrostatic forces are applied to the fluids. The fluid configurations cause a different strength of an electric field to be applied to different parts of the fluids within the cavity. Consequently, initiation of a motion of the fluids occurs at a first part of the peripheral edge before initiation of fluid motion occurs at a second different part of the edge. In this way, the different wettabilities of the first and second surfaces control fluid motion within the cavity.

This controlled movement of the fluids in examples ensures that repeated switching of the fluids between an on-state, where the fluid motion control system is activated, and an off-state, where the fluid motion control system is not activated, produces consistent fluid motion. In a display device, for example, incorporating a plurality of the optical apparatus of embodiments, this consistency allows the device to display high quality still and moving images without undesired image imperfections. Thus, homogeneity between different pixels of the display device may be achieved.

In embodiments, the first fluid may be electrically non-conducting and the second fluid may be electrically conducting. The first surface may have a lower wettability for the first fluid than for the second fluid and the second surface may have a higher wettability for the first fluid than for the second surface. The fluid motion control system in examples uses the principles of electrowetting to move the fluids; the fluid motion control system may be arranged to apply a voltage across the first and second fluids to provide the electrostatic forces. The second fluid may be optically transparent; the first fluid may be optically opaque; and/or at least one of the first and second fluids may be coloured.

Said first and second surfaces may be arranged such that a thickness of said first fluid at said first part is less than a thickness of said first fluid at a second part of said peripheral edge.

Owing to a difference between a tendency of the first and second fluids to wet the first surface, one of the first and second fluids prefers to wet the first surface more than the other of the two fluids. One of the fluids may coat the first surface only thinly, or may not coat the first surface whatsoever, but will readily wet the second surface, because of the difference in wettabilities of the two surfaces, thus causing the thickness of the first fluid to be different at the first and second parts. This determines the configurations of the fluids before activation of the fluid motion control system, thus influencing where and when fluid motion initiates upon activation.

As will be described in further detail later, the thickness of the first fluid is defined herein as a distance taken between the meniscus and the second surface. A change in first fluid thickness also, generally, causes a change in second fluid thickness. Variation of the thickness of the first fluid influences the strength of the electric field applied to different parts of the first fluid, thus controlling fluid motion initiation.

In known switchable optical systems, which utilise electrowetting, a voltage must be applied above a voltage threshold to initiate fluid motion. In embodiments, the wettabilities of the first and second surfaces can be arranged such that the threshold may be reduced, or eliminated, by ensuring that at least part of the first fluid has a particular thickness. In this way, a reduced voltage is required to initiate fluid motion and the apparatus of embodiments requires a low power to be operated. This may be advantageous for portable applications of the apparatus where power is supplied by a battery or suchlike, as the duration of operation between replacing or recharging the power source is increased. Reduction or elimination of the voltage threshold reduces or removes any hysteresis from a curved plot of the voltage required to obtain different fluid configurations of the apparatus. This may allow a large number of consistently reproducible fluid configurations to be obtained for reliably providing different grey-scale states of the apparatus.

In an embodiment, said first and second surfaces are arranged within said cavity to determine, upon activation of said fluid motion control system, a preferential direction of flow of said fluids within said cavity.

By initiating the fluid motion at the first part, before the second part, the first fluid tends to flow in a particular direction within the cavity. As the first fluid moves, the second fluid moves also, to occupy any space within the cavity which is no longer occupied by the first fluid. By appropriately arranging the first and second surfaces, a desired fluid flow direction may be obtained. For a display device including a plurality of the apparatus as pixels, this ensures homogeneity of fluid configurations from pixel to pixel.

At least part of said first surface may be coloured black and may be arranged at least partly at a periphery of said cavity.

Colouring the first surface black in this way can provide an improved optical contrast of a display device which includes a plurality of the optical apparatus.

In a yet further embodiment, said cavity is defined by at least one wall, wherein said at least one wall comprises at least part of said first surface.

Incorporating the first surface as part of the wall allows the optical apparatus according to embodiments to be manufactured simply and efficiently.

In another embodiment said first and second surfaces are arranged within said cavity to determine, upon activation of said fluid motion control system, a preferential location within said cavity for said first fluid to occupy.

The optical apparatus may be provided so as to control a location in the cavity where at least the first fluid prefers to reside once fluid motion has been activated. In this way, an end point is provided for the first fluid when fluid motion is completed. Thus, fluid motion for repeated fluid switchings is consistent. Where multiple of the optical apparatus is included in a display device as pixels, this consistency allows high quality still and moving images to be displayed, with minimal inhomogeneity between pixels of the display.

The apparatus may comprise a further surface, having a greater wettability for said first fluid than said second surface, which is arranged in said cavity to determine said preferential location.

Provision of the further surface is a simple and effective arrangement for determining the preferential location.

In embodiments the optical apparatus further comprises:
e) a third fluid, immiscible with said second fluid, which is separated from said second fluid by a further meniscus having a different peripheral edge; and
f) a third surface and a fourth surface, said third surface having a different wettability for said third fluid than said fourth surface, wherein said third and fourth surfaces are arranged in said cavity to determine, upon activation of the fluid motion control system, a motion of said second and third fluids within said cavity which has a preferential initiation at a first part of said different peripheral edge.

The third fluid allows the optical apparatus to provide further adjustable optical characteristics. In embodiments where at least one of the fluids is coloured, switching of either the first and/or the third fluid into the path of a radiation beam allows the apparatus to modify differently the colour of the beam. The third and fourth surfaces provide for controlled fluid motion which is similar to that provided by the first and second surfaces. Apparatus including the first, second, third and fourth surfaces allows a high variety of adjustable optical characteristics to be provided, by providing simultaneous motion of the first, second and third fluids in a highly controlled and efficient manner.

In accordance with further embodiments, there is provided a display device for displaying an image, wherein said display device includes at least one of an optical apparatus which comprises:
a) a cavity;
b) a first fluid and a second fluid, held within said cavity, which are immiscible with each other, said first and second fluids being separated from each other by a meniscus having a peripheral edge;
c) a fluid motion control system arranged to control movement of said first and second fluids within said cavity using electrostatic forces; and
d) a first surface and a second surface, said first surface having a different wettability for said first fluid than said second surface, wherein said first and second surfaces are arranged in said cavity to determine, upon activation of the fluid motion control system, a motion of said fluids within said cavity which has a preferential initiation at a first part of said peripheral edge.

By incorporating the optical apparatus of embodiments into a display device, a display device is provided with highly controllable optical characteristics.

The device may include a plurality of said optical apparatus which are each arranged to operate as a display pixel or sub-pixel within said display device and are each arranged relative to each other to form a display pixel matrix.

The consistency of fluid motion provided by the optical apparatus ensures that optical characteristics of the device may be adjusted in a homogeneous manner across the pixel matrix. Thus the display device may provide still and moving images of a high quality.

FIG. 1 shows schematically a cross-section of an optical apparatus 1, in accordance with an embodiment.

The optical apparatus 1 comprises an electrowetting cell which corresponds, in this embodiment, with one sub-pixel for a display device. The optical apparatus 1 includes three different sub-pixel regions 2, 4, 6. The apparatus 1 comprises a bottom and a top transparent substrate or support plate 8, 10 common to the plurality of sub-pixel regions 2, 4, 6. Between the top and bottom substrates 8, 10 and around a periphery of the apparatus 1 is at least one wall.

Incomplete walls 12 of the apparatus 1 separate the sub-pixel regions 2, 4, 6 from each other, and are supported by the bottom substrate 10, but do not extend so as to join with the top substrate 8. A cavity 13, for holding at least one fluid is defined by the substrates 8, 10 and the walls 11, 12. At least part of a surface of any of the walls 11, 12 which faces the cavity 13 may be less wettable for the first liquid 14 and more wettable for the second liquid 16. For example, such surfaces may be hydrophilic. Further details of the electrowetting cell and its manufacture are disclosed amongst others in international patent applications WO 2005/098797 and WO 2006/017129.

The cavity 13 of the apparatus 1 includes a first fluid and a second fluid, which in this embodiment are a first liquid 14 and a second liquid 16, respectively. The first and second liquids 14, 16 are immiscible with each other. The first liquid 14 is electrically non-conductive and may for example be an alkane like hexadecane or (silicone) oil. The second liquid 16 is electrically conductive or polar, and may be a water or salt solution such as a solution of KCl in a mixture of water and ethyl alcohol. The first liquid 14 may be opaque and the second liquid 16 may be transparent. The volume of the second liquid 16 is greater than the volume of the first liquid 14.

Arranged on top of the bottom substrate 10 is a first electrode 18 which is covered in this embodiment by a hydrophobic layer 20, which has a uniform thickness and which faces the cavity 13. This layer is for example an amorphous fluoropolymer layer such as Teflon™ AF1600. The hydrophobic character causes the first liquid 14 to adhere preferentially to the hydrophobic layer 20.

The hydrophobic layer 20 acts as an insulator, separating the first electrode 18 from the liquids 12, 14. In further embodiments, a further insulating layer may be applied between the first electrode 18 and the hydrophobic layer 20.

A second electrode 22 is connected to the conductive second liquid 16. This electrode can be common to a series of sub-pixels 2, 4, 6 that share the second liquid 16, uninterrupted by walls 12. The first electrode 18 is connected to an electrical terminal on the bottom substrate 10 by a matrix of printed wiring. The electrodes and wiring may be transparent and made of e.g. indium tin oxide. The matrix may include switching elements such as transistors; in this case the matrix is called an active matrix.

Figure 2:
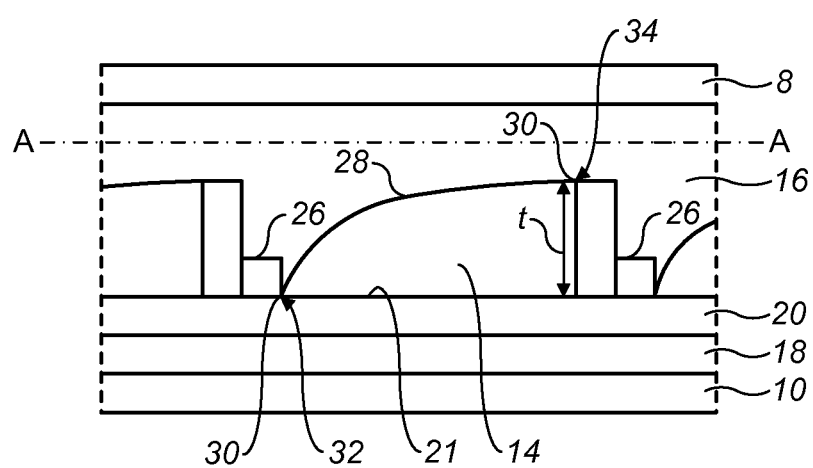
FIG. 2 shows schematically a cross section of part of the apparatus of an embodiment.
Figure 3:
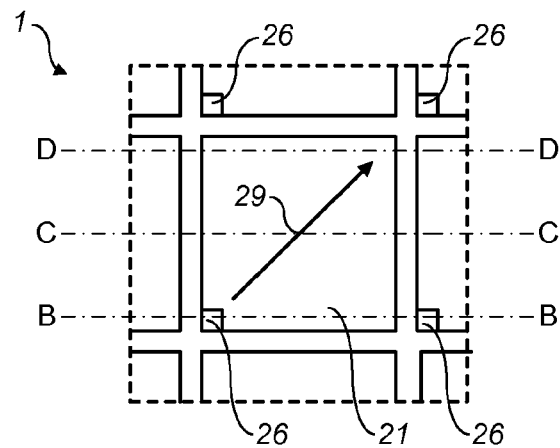
FIG. 3 shows schematically a different cross section of the part of the apparatus in accordance with an embodiment.

FIG. 2 shows schematically part of the apparatus 1 which is indicated in FIG. 1 by the dashed section 24. Arranged on top of part of the hydrophobic layer 20 is a first surface 26 which is hydrophilic and is formed of, for example an acrylic or polyester. The first surface 26 is provided by a hydrophilic layer arranged on the hydrophobic layer 20. FIG. 3 shows schematically a cross section of the part of the apparatus 1 shown in FIG. 2 along line A-A and taken in a plane perpendicular to the plane of FIG. 2. For clarity, the first and second liquids 14, 16 are not indicated. As shown in FIG. 3, each sub-pixel 2, 4, 6 is square in shape, and one first surface 26 is arranged in one corner of each of the sub-pixels 2, 4, 6. The first surface may be in the same position for each sub-pixel.

The hydrophobic layer 20 provides a second surface 21 of the apparatus 1, which faces the cavity 13. The first surface 26 has a different wettability for the first liquid 14 than the second surface 21. In this embodiment, the first surface 26 has a lower wettability for the first liquid 14 than the second surface 21 and a higher wettability for the second liquid 16 than the second surface 21. The second surface 21 has a higher wettability for the first liquid 14 than the first surface 26 and a lower wettability for the second liquid 16 than the first surface 26.

Referring again to FIG. 2, which shows the configurations of the liquids 14, 16 with zero voltage applied across the electrodes 20, 22, the first and second liquids 14, 16 are immiscible with each other and are separated from each other by a meniscus 28 having a peripheral edge 30. The peripheral edge is the boundary rim of the meniscus 28. The second liquid 16 does not readily wet the first surface 26, and therefore a first part 32 of the peripheral edge 30 is located at an interface formed between the first surface 26 and the second surface 21. A thickness t of the first liquid 14 at a second different part 34 of the edge 30 is taken in a direction in the plane of FIG. 2 between the meniscus 28, at the second part 34, and the second surface 21. Thicknesses of the first liquid 14 subsequently referred to herein will be taken in the same direction. A thickness of the first liquid 14 at the first part 32 is less than the thickness t at the second part 36, and in this embodiment is zero. The thickness of the first liquid 14 increases, with at least a partly curved profile, from the first part 32 to the second part 34. In this embodiment, the first liquid 14 covers the second surface 21 but does not cover the first surface 26, and the second liquid 16 covers the first surface 26, but does not cover the second surface 21.

The apparatus 1 comprises a fluid motion control system (not shown) which includes the first and second electrodes 18, 22. The fluid motion control system is arranged to control movement of the first and second liquids 14, 16 within the cavity 13, using the principles of electrowetting. By applying a voltage between the electrodes 18, 22 an electric field is applied between the electrodes and across the liquids 14, 16, causing the liquids to move due to electrostatic forces. As the second liquid 16 is electrically conducting, the second liquid 16 has approximately the same electrical potential as the second electrode 22. Consequently, the voltage applied across the electrodes 20, 22 is also present across the thickness of the first liquid 14.

When the fluid motion control system is not activated, no voltage is applied across the second surface 21. When the fluid motion control system is activated, a voltage is applied across the second surface 21. The applied voltage causes the second surface 21 to become more electrostatically charged. Therefore, upon activation, the second liquid 16 is attracted to the second surface 21 and the first liquid 14 is repelled from the second surface 21. The fluid motion control system can thus switch the liquids 14, 16 within the cavity 13. Upon activation, the first liquid 14 contracts across the second surface 21, but the liquids 14, 16 do not completely switch positions with each other in the cavity 13.

Referring to FIG. 3, the first and second surfaces 26, 21 are arranged such that, upon activation of the fluid motion control system, the first liquid 14 flows within the cavity 13 in a preferential direction, as indicated by arrow 29.

As the first liquid thickness at the first part 32 is less than the first liquid thickness t at the second part 34, an electric field across the second liquid 16 is greater in strength at the first part 32 than at the second part 34, for a given applied voltage. The second liquid 16 therefore feels a greater attractive force to the second surface 21 at the first part 32 than at the second part 34, and motion of the two liquids 14, 16 initiates at the first part 32 before the second part 34. The initiation occurs along the interface between the first and second surfaces 26, 21. During this movement of the liquids 14, 16 parts of the cavity 13 occupied by the first liquid 14 before activation become occupied by the second liquid 16. Once motion of the first liquid 14 has been initiated at the first part 32, the first liquid flows in the preferential direction 29 away from the corner with the first surface 26, across the second surface 21, towards the diagonally opposite corner of the sub-pixel, as determined by the arrangement of the first and second surfaces 26, 21 within the cavity 13. The second liquid 16 flows to cover the second surface 21 also in a preferential direction which is approximately opposite to the preferential direction 29 of the first liquid 14. The first liquid thickness at the first part 32 may provide a low, or even absent voltage threshold for the applied voltage which is required to initiate liquid motion.

In this embodiment, once liquid motion has occurred to a maximum extent, and with the fluid motion control system still activated, the first liquid 14 covers a minimum area of the second surface 21 in the corner towards which the first liquid 14 preferentially flowed. To minimise contact with the second surface 21, which has a greater electrostatic charge during the activation, the first liquid 14 has a maximum thickness which is greater than the thickness t of the first liquid 14 at the second part 34 before activation. The arrangement of the first and second surfaces 26, 21 therefore also determines a location within the cavity 13 of the sub-pixel for occupation by the first liquid 26 once maximum fluid motion is completed.

Figure 4A:
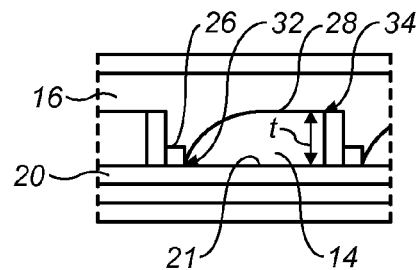
FIGS. 4a, 5a and 6a each show schematically a cross section of the apparatus before a fluid motion initiation, according to an embodiment.
Figure 4B:
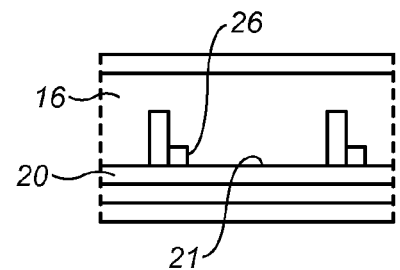
FIGS. 4b, 5b and 6b each show schematically a cross section of the apparatus following the fluid motion initiation, according to an embodiment.
Figure 5A:
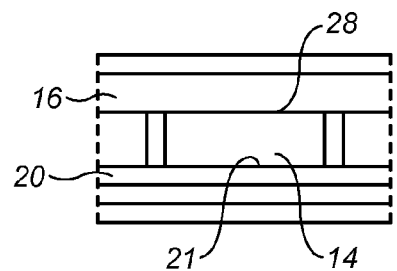
Figure 5B:
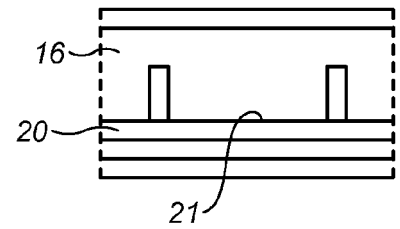
Figure 6A:
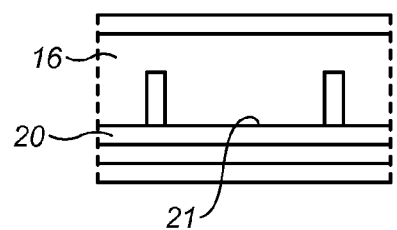
Figure 6B:
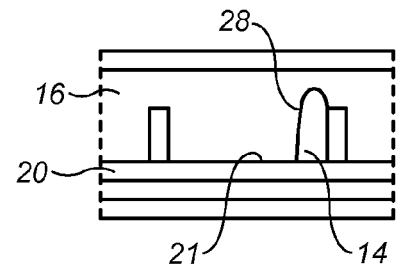

FIGS. 4a, 4b, 5a, 5b, 6a and 6b show configurations of the liquids within the cavity 13 before and after activation. Each of these Figures show a cross section of the part of the apparatus 1 shown in FIG. 3, taken in a plane perpendicular the plane of FIG. 3. FIGS. 4a and 4b, 5a and 5b, and 6a and 6b are viewed in the plane indicated along the lines B-B, C-C and D-D of FIG. 3, respectively. FIGS. 4a, 5a and 6a show the apparatus 1 before activation of the fluid motion control system and FIGS. 4b, 5b and 6b show the apparatus 1 after activation, and once maximum fluid motion has occurred.

Figure 7:
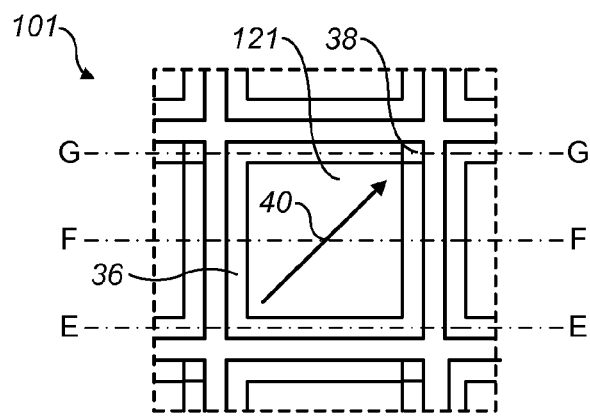
FIG. 7 shows schematically a cross section of part of the apparatus in accordance with a different embodiment.

FIG. 7 shows a cross-section of the apparatus, taken in the same plane as that of FIG. 3, of a different embodiment. Features of this embodiment are similar to features described for previous embodiments and are referred to using the same reference numerals, incremented by 100; corresponding descriptions should be taken to apply here also.

In this embodiment, a first surface 36, having similar properties to the first surface described hereinbefore, is arranged on the inside, not the outside, of at least part of the periphery of part of the cavity 113 within each sub-pixel 102, 104, 106. The first surface 36 is arranged on a peripheral part of the second surface 121 and extends along a base part of each of the walls 111, 112; however, in one corner of each sub-pixel, the first surface 36 is absent, thus exposing a part 38 of the second surface 121 to the cavity 113.

As the first liquid 114 prefers not to wet the first surface 36, the thickness of the first liquid 114 varies across the cavity 113, for similar reasons as those described for the previous embodiment. Before activation, the first liquid 114 prefers to wet, and therefore to cover, the parts of the second surface 121 exposed to the cavity 113, including the exposed part 38. Parts of the first liquid 114 which cover such exposed parts of the second surface 121 may be merged with each other before activation. Upon activation of the fluid motion control system, liquid motion first initiates at the parts of the edge 130 closest to the first surface 36, and therefore along a line corresponding with the interface between the first and second surfaces 36, 121. Upon activation, the first liquid 114 moves in a preferential direction 40, across the second surface 121, towards the exposed part 38 of the second surface 121 from the corner of the sub-pixel diagonally opposite the exposed part 38. The second liquid 116 moves in a different preferential direction, upon switching, for similar reasons as those described previously.

Figure 8A:
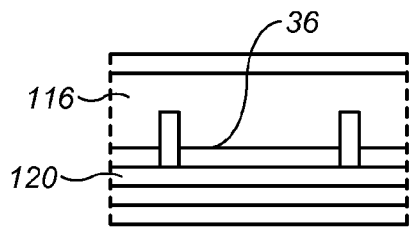
FIGS. 8a, 9a and 10a each show schematically a cross section of the apparatus before a fluid motion initiation, according to an embodiment.
Figure 8B:
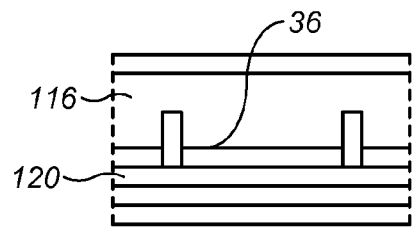
FIGS. 8b, 9b and 10b each show schematically a cross section of the apparatus following the fluid motion initiation, according to an embodiment.
Figure 9A:
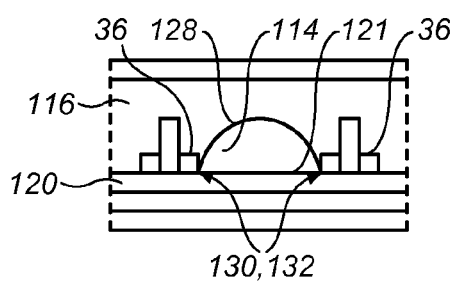
Figure 9B:
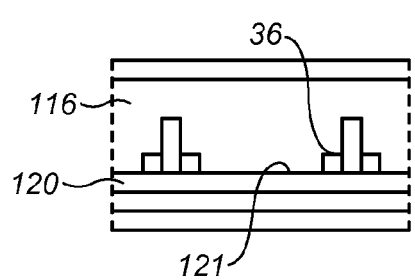
Figure 10A:
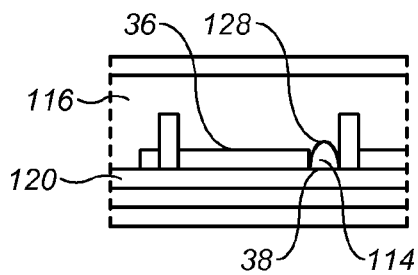
Figure 10B:
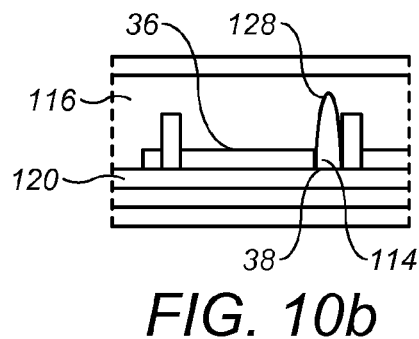

FIGS. 8a, 8b, 9a, 9b, 10a and 10b show configurations of the liquids within the cavity 113 before and after activation, in this embodiment. Each of these Figures shows a cross section of the part of the apparatus 101 shown in FIG. 7, taken in a plane perpendicular the plane of FIG. 3. FIGS. 8a and 8b, 9a and 9b, and 10a and 10b are viewed in the plane indicated along the lines E-E, F-F and G-G of FIG. 7, respectively. FIGS. 8a, 9a and 10a show the apparatus 101 before activation of the fluid motion control system and FIGS. 8b, 9b and 10b show the apparatus 101 after activation and once maximum fluid motion has occurred.

In this embodiment, with reference to FIG. 9a, the meniscus 128 has a different thickness profile than that shown in FIG. 4a, because the first surface 36 is arranged on two opposite sides of the sub-pixel, with the first liquid 114 in-between. Initiation first occurs at more parts of the edge 130 than for the previous embodiment, due to the greater extent of the first surface 36. Following activation and complete movement of the liquids, and as shown in FIG. 10b, the volume of the first liquid 114 located on and above the exposed part 38 before activation (as shown in FIG. 10a) now also includes the volume of first liquid 114 which occupied the rest of the cavity 113 of the sub-pixel 104 before activation.

Figure 11:
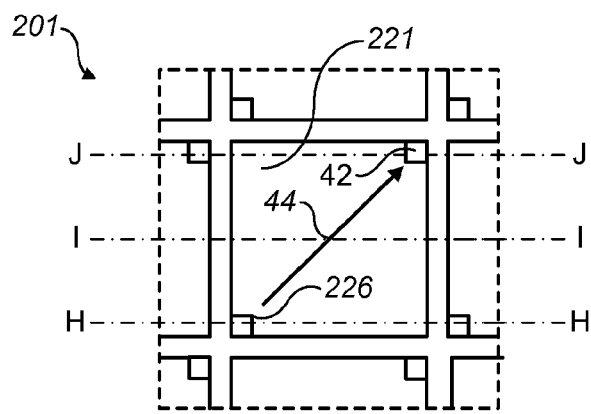
FIG. 11 shows schematically a cross section of the part of the apparatus in accordance with a different embodiment.

FIG. 11 shows schematically a cross-section of the apparatus of a different embodiment, taken in the same plane as that of FIG. 3. Features of this embodiment are similar to features described for previous embodiments and are referred to using the same reference numerals, incremented by 200; corresponding descriptions should be taken to apply here also.

In this embodiment, the apparatus 201 is similar to that described using FIGS. 1, 2 and 3. The apparatus 201 comprises a further surface 42, which has a greater wettability for the first liquid 214 and a lower wettability for the second liquid 216 than the second surface 221. In this embodiment the further surface 42 is hydrophobic and is formed of, for example, a fluoropolymer. The further surface 42 is arranged on the second surface 221 in a corner of the sub-pixel 204 which is diagonally opposite and in the same plane as the corner in which the first surface 226 is positioned. Before activation of the fluid motion control system, the first liquid 214 wets both the second surface 221 and the further surface 42. The first liquid 214 has a similar configuration before activation as that of the first liquid 214 of the embodiment described using FIGS. 2 and 3.

Upon activation of the fluid motion control system, motion of the liquids 214 and 216 initiates at the first part of the meniscus 228, in a similar manner as that described using FIGS. 2 and 3. The first liquid 214 moves in a preferential direction 44 across the second surface 221 and away from the first surface 226, which is similar to the preferential direction 28 described using FIGS. 2 and 3. Following activation, and after a maximum extent of liquid movement, the first liquid 214 covers the further surface 42 and occupies part of the cavity 213 located above the further surface 42. As the further surface 42 is more wettable for the first liquid 114 than the second surface 221, the first liquid 114 prefers to wet the further surface 42 rather than the second surface 221 upon activation.

Figure 12A:
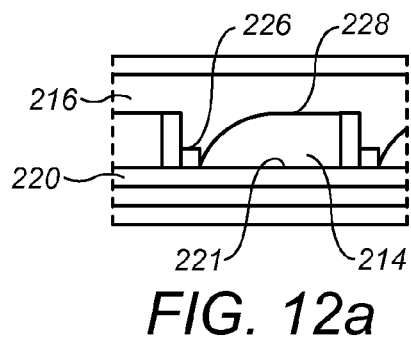
FIGS. 12a, 13a and 14a each show schematically a cross section of the apparatus before a fluid motion initiation, according to an embodiment.
Figure 12B:
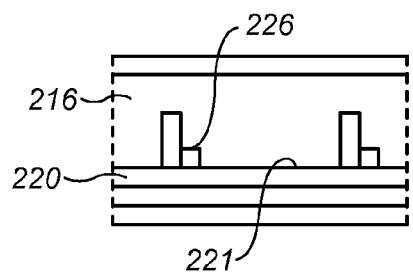
FIGS. 12b, 13b and 14b each show schematically a cross section of the apparatus following the fluid motion initiation, according to an embodiment.
Figure 13A:
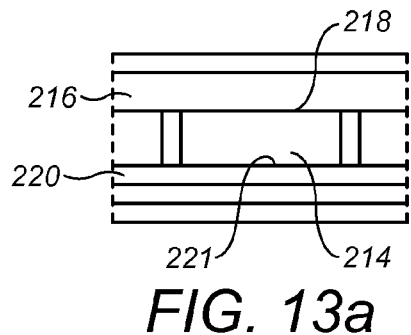
Figure 13B:
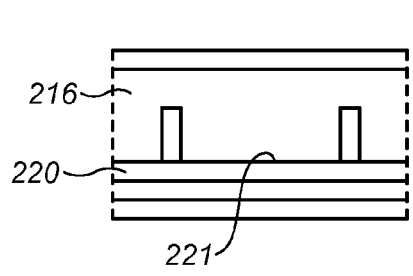
Figure 14A:
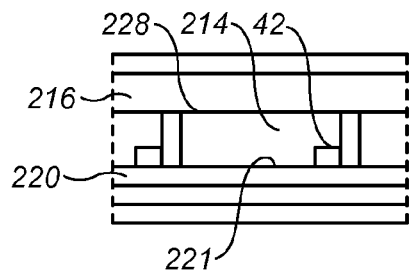
Figure 14B:
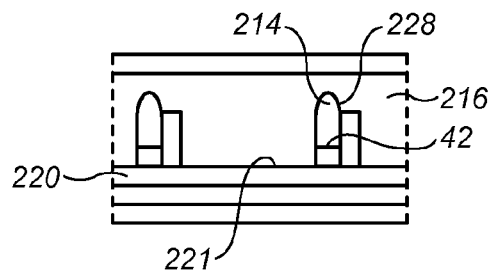

FIGS. 12a, 12b, 13a, 13b, 14a and 14b show configurations of the liquids before and after activation, in this embodiment. Each of these Figures shows a cross section of the part of the apparatus 201 shown in FIG. 11, taken in a plane perpendicular the plane of FIG. 7. FIGS. 12a and 12b, 13a and 13b, and 14a and 14b are viewed in the plane indicated along the lines H-H, I-I and J-J of FIG. 11, respectively. FIGS. 12a, 13a and 14a show the apparatus 201 with activation of the fluid motion control system and FIGS. 12b, 13b and 14b show the apparatus 201 after activation and once maximum fluid motion has occurred.

The above embodiments are to be understood as illustrative examples. Further embodiments are envisaged.

For example, the apparatus according to embodiments may further comprise a third fluid which is immiscible with the second liquid, and which is separated from the second liquid by a further meniscus having a different peripheral edge. The third fluid may also be immiscible with the first liquid. The third fluid may be an alkane like hexadecane or (silicone) oil. The top transparent substrate may be arranged with an electrode and a hydrophobic layer which faces the cavity, in a similar manner to the bottom plate described previously. A third surface, for example a surface with similar properties as the first surface, may be arranged on a fourth surface. The fourth surface is herein defined as a surface provided by the hydrophobic layer of the top plate and may have similar properties to the second surface described previously. Thus, the third surface has a different wettability for the third fluid than the fourth surface. The third and fourth surfaces are arranged in the cavity to determine, upon activation of the fluid motion control system, a preferential motion of the second and third fluids within the cavity which has a preferential initiation at a first part of the different peripheral edge, before initiation of motion at a second different part of the peripheral edge.

The optical apparatus according to embodiments may be arranged for incorporation within a display device for displaying an image, such as a display of a mobile telephone. The display may include a plurality of the optical apparatus which are each arranged to operate as a display pixel within the display. Each apparatus may be arranged relative to each other to form a display pixel matrix, as is illustrated in FIGS. 3, 7 and 11.

At least part of an inside of a periphery of each sub-pixel of the apparatus may be blackened to improve optical contrast of the display. For example, the first surface of each sub-pixel of the embodiment described using FIG. 7 may be coloured black, so as to provide a black matrix. At least part of the second surface, which may also be arranged at least partly at the periphery of the cavity, and/or at least part of the walls, may also be coloured black to improve the optical contrast.

The first, second, third, fourth and further surfaces may be differently arranged in the apparatus than as described. For example, the surfaces may have a greater or smaller surface area and may be shaped in different configurations, so as to determine the preferential direction of fluid motion. The materials of the surfaces, having particular wettabilities, may be selected to obtain a particular motion of the liquids. Yet further surfaces may also be arranged within the cavity to provide further control of fluid motion.

As previously described, the first liquid does not tend to wet the first surface, and there are parts of the meniscus edge which lie at the interface between the first and second surfaces. In further embodiments, the first liquid may in fact wet at least part of the first surface by a certain extent. This may depend on factors including, for example, the volume of the liquids in the cavity, the specific wettabilities of the first and second surfaces, and the specific properties of the first and second liquids.

The fluids used may be different to those described. Certain fluid materials may be selected to obtain the preferential direction of motion, for example because of their particular tendency to wet, or not to wet, at least one of the surfaces. At least one of the fluids may be optically opaque or transparent. Additionally, at least one of the fluids may be coloured. The apparatus in embodiments is arranged to transmit electromagnetic radiation, for example radiation in the visible light spectrum, through at least the second fluid. Where at least one of the fluids is opaque, the apparatus may act as an optical shutter and where at least one of the fluids is coloured, the apparatus can modify a visible colour of the radiation passing through the apparatus. The radiation may be natural light, or the radiation may be provided by a light source.

The fluid motion control system may be arranged to apply different voltages to the fluids, so as to obtain different fluid configurations. As previously described, upon activation of the fluid motion control system, the liquids are moved by a maximum extent so that the first liquid covers a minimum area of the second surface. Intermediate fluid configurations may be achieved by the fluid motion control system applying different voltages, so that the first liquid covers different, non-minimum extents of the second surface. This can be beneficial as, when the first liquid is opaque, the apparatus can be arranged to provide a plurality of different liquid configurations for providing different grey-scale levels.

The shape of the apparatus, and of the sub-pixels, may be different to those described. Further, at least part of the walls may comprise at least part of the first surface. For example, the first surface may form a lower part of the walls. An upper part of the walls may have a width, taken in a direction from one sub-pixel to an adjacent sub-pixel, which is less than a width, taken in the same direction, of the first surface. Thus, the first surface may extend into each sub-pixel beyond the upper part of the walls.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting element comprising:
a first fluid;
a second fluid immiscible with the first fluid;
a support plate;
a first surface and a second surface, the first surface adjoining less than all of a perimeter of the second surface, the first surface having a first wettability for the first fluid lower than a second wettability of the second surface for the first fluid;
at least one wall, the first surface located in a corner of the electrowetting element; and
an electrode associated with the support plate for use in application of a voltage to control a configuration of the first fluid and the second fluid,
wherein the first fluid and the second fluid are switchable between:

a first configuration of the first fluid and the second fluid, without application of the voltage using the electrode, with the first fluid adjoining a first area of the second surface; and a second configuration of the first fluid and the second fluid, with application of the voltage using the electrode, with the first fluid adjoining a second area of the second surface, the second area being smaller than the first area.

2. The electrowetting element according to claim 1, wherein, with the first fluid and the second fluid in the first configuration, a thickness of the first fluid decreases towards the first surface.

3. The electrowetting element according to claim 1, wherein, with the first fluid and the second fluid in the first configuration, a thickness profile of the first fluid depends on a difference between the first wettability of the first surface and the second wettability of the second surface.

4. The electrowetting element according to claim 1, wherein, upon application of the voltage for the second configuration, a first part of the first fluid having a first thickness corresponds with a greater magnitude of electric field applied across the first fluid than a second part of the first fluid having a second thickness greater than the first thickness.

5. The electrowetting element according to claim 1, wherein, with the first fluid and the second fluid in the first configuration, a thickness profile of the first fluid is asymmetric.

6. The electrowetting element according to claim 1, wherein, with the first fluid and the second fluid in the first configuration, motion of part of the first fluid starts at a location of the first surface, before motion of a different part of the first fluid starts, upon application of the voltage for the second configuration.

7. The electrowetting element according to claim 1, wherein, with the first fluid and the second fluid in the first configuration, motion of part of the first fluid starts at a location where the first surface adjoins the second surface, before motion of a different part of the first fluid starts, upon application of the voltage for the second configuration.

8. The electrowetting element according to claim 7, wherein, with the first fluid and the second fluid in the first configuration, the first surface adjoins the second surface where part of an edge of the first fluid adjoins the support plate.

9. The electrowetting element according to claim 1, wherein, with the first fluid and the second fluid in the first configuration, substantially all of the second surface is adjoined by the first fluid and substantially all of the first surface is adjoined by the second fluid.

10. The electrowetting element according to claim 1, wherein the first surface is hydrophilic and the second surface is hydrophobic.

11. The electrowetting element according to claim 1, comprising:

a first layer having the first surface; and a second layer having the second surface, the first layer located on part of the second layer.

12. The electrowetting element according to claim 1, the first surface adjoining a first part of the perimeter of the second surface and the at least one wall adjoining a second part of the perimeter of the second surface.

13. The electrowetting element according to claim 1, the at least one wall adjoining substantially all of the perimeter of the second surface not adjoined by the first surface.

14. The electrowetting element according to claim 1, the at least one wall comprising at least part of the first surface.

15. The electrowetting element according to claim 1, wherein, with the first fluid and the second fluid in the first configuration, the voltage for the second configuration has a magnitude greater than a voltage threshold for starting motion of the first fluid, the voltage threshold depending on a difference between the first wettability of the first surface and the second wettability of the second surface.

16. The electrowetting element according to claim 15, wherein the voltage threshold has a magnitude greater than substantially zero.

17. The electrowetting element according to claim 1, comprising a further surface adjoining a further part of the perimeter of the second surface, the further part being different from a first part of the perimeter of the second surface adjoined by the first surface, the further surface having a further wettability for the first fluid greater than the second wettability of the second surface.

18. The electrowetting element according to claim 17, wherein the first surface is located at a first side of the second surface substantially opposite to a second side of the second surface where the further surface is located.

19. The electrowetting element according to claim 1, wherein at least part of the first surface is blackened.

* * * * *